United States Patent
Yan (10) Patent No.: US 7,358,656 B1
(45) Date of Patent: Apr. 15, 2008

(54) UNIVERSAL COOLING POINTS FOR FLUORESCENT LAMPS

(75) Inventor: Ellis Yan, Auburn, OH (US)

(73) Assignee: Technical Consumer Products, Inc. a Delaware Corporation, Aurora, OH (US)

( * ) Notice: Subject to any disclaimer, the term of this patent is extended or adjusted under 35 U.S.C. 154(b) by 427 days.

(21) Appl. No.: 11/049,965

(22) Filed: Feb. 4, 2005

(51) Int. Cl.
*H01J 61/52* (2006.01)

(52) U.S. Cl. .................. 313/44; 313/27; 313/484

(58) Field of Classification Search .......... 313/27, 313/44, 318.01–318.12, 484
See application file for complete search history.

(56) References Cited

U.S. PATENT DOCUMENTS

| | | | |
|---|---|---|---|
| 5,500,567 | A | 3/1996 | Wilson et al. |
| 6,528,953 | B1 | 3/2003 | Pearson et al. |
| 6,630,779 | B1 | 10/2003 | Tokes et al. |
| 6,633,128 | B2 | 10/2003 | Ilyes et al. |
| 6,650,042 | B2 | 11/2003 | Hammer |
| 6,731,070 | B2 | 5/2004 | Scholl et al. |
| 6,741,023 | B2 | 5/2004 | Pirovic |
| 2002/0180352 | A1* | 12/2002 | Ilyes et al. ............ 313/573 |

* cited by examiner

Primary Examiner—Joseph Williams
Assistant Examiner—Bumsuk Won
(74) Attorney, Agent, or Firm—Joseph H. Taddeo (57) ABSTRACT

A low-wattage, bi-helically shaped, compact fluorescent lamp, having preferably a wattage rating of preferably 23-watts, to sustain constant luminous output when the lamp is mounted in either in an upright position or mounted lying in the horizontal plane, by the unique placement of two cooling point chambers on the periphery of the bi-helical lamp. In an alternative embodiment, a medium wattage compact fluorescent lamp performs ideally by using three cooling points chambers, whereas higher wattage sized lamps perform best utilizing preferably four to five cooling point chambers. Hence, the plurality of cooling point chambers required for omni-directional mounting of the lamp is functional with the physical size of the lamp, its wattage rating, the quantity of mercury needed and the placement of each cooling point chamber.

3 Claims, 14 Drawing Sheets

PRIOR ART

FIG. 1

PRIOR ART

UNIVERSAL COOLING POINTS FOR FLUORESCENT LAMPS

FIELD OF INVENTION

The present invention relates primarily to compact fluorescent lamps, and more particularly to dual spirally wound compact fluorescent lamps, having a plurality of cooling points, strategically placed along the periphery, to provide for an equivalent lamp intensity when operated in either an upright vertical position or in a horizontal plane. The lamp is provided with a cold chamber portion connecting the ends of the spiral shaped tube portions at the apex and a plurality of cold chambers at each leg of the distal ends.

BACKGROUND OF THE INVENTION

The optimum mercury vapor pressure for producing a radiation of 2537 angstroms to excite a phosphor coating on the interior of a fluorescent lamp, which approximates six millitorr, at a corresponding mercury vapor temperature approximating 40 degrees C. To ensure optimum operation of the lamp at or about a mercury vapor pressure of six millitorr, the power density level of a conventional fluorescent lamp is adjusted to attain this result. A typical range of operating pressures may span from between four to seven millitorr. The lamp is typically designed such that the coolest location, (cooling point), in the fluorescent lamp is approximately 40 degrees C.

Compact fluorescent lamps, however, operate at higher power densities with the cold spot temperature typically exceeding 50 degrees C. As a result, the mercury vapor pressure is higher than the optimum four to seven millitorr range, and the luminous output of the lamp is decreased.

One consideration in controlling the mercury vapor pressure is to use an alloy capable of absorbing mercury from its gaseous phase in varying amounts, depending upon temperature. Alloys capable of forming amalgams with mercury have been found to be particularly useful. The mercury vapor pressure of such an amalgam at a given temperature is lower than the mercury vapor pressure of pure liquid mercury.

Positioning an amalgam to achieve a mercury vapor pressure in the optimum range remains difficult. For stable long-term operation, the amalgam should be placed and retained in a relatively cool location with minimal temperature variation. Such an optimal location is at or near the tip, or apex, of the lamp envelope.

As a practical solution, the amalgam support should maintain the optimal location of the amalgam, regardless of the orientation of the lamp.

The following prior art discloses the various aspects in the design of spirally shaped cold cathode fluorescent lamps.

U.S. Pat. No. 5,500,567, granted Mar. 19, 1996, to R. H. Wilson, et al., discloses an apparatus for securing an amalgam at the apex of an electrodeless fluorescent lamp, having a glass rod extending through and sealed to the exhaust tube of an electrodeless SEF fluorescent discharge lamp that has a metal support member at one end thereof for supporting an amalgam at or near the apex of the lamp envelope. The metal support member may comprise a spiral-shaped wire, a wire screen, or a wire basket. Preferably, the amalgam is maintained in contact with the apex of the lamp envelope. If desired, the metal support member may comprise a magnetic material to allow for magnetic transport of the amalgam assembly during lamp processing. The metal support member restricts spreading of the amalgam when in a liquid state; and the glass rod provides rigid support for the amalgam independent of lamp orientation.

U.S. Pat. No. 6,528,953, granted Mar. 4, 2003, to N. Pearson, et al., discloses an Amalgam retainer having an arc discharge lamp comprised of an arc chamber having an amalgam tip attached to and communicating with it. The communication comprises a narrow tubular extension that penetrates the amalgam tip for a distance less than the depth of the tip. An amalgam that includes bismuth is contained within the amalgam tip. This construction allows operation of the lamp in any position and prevents the bismuth in the amalgam from penetrating the lamp and poisoning the phosphor.

U.S. Pat. No. 6,630,779, granted Oct. 7, 2003, to J. Tokes, et al., discloses a fluorescent lamp wherein the discharge tube is bent substantially in plane. The fluorescent lamp is comprised of a discharge tube disposed substantially in a plane and shaped at least in part to define a substantial portion of the boundary of a zone in the plane. The part of the tube defining the boundary includes at least one straight portion. The discharge tube has a central axis and sealed ends provided with electrodes and at least two tube sections running substantially parallel to each other. Each tube section has at least one blind-sealed end and the tube sections are connected in series through bridges in the vicinity of the blind-sealed ends to define a single continuous discharge space to be excited by electrical power supplied to the electrodes. A lamp support housing is positioned within the zone and the ends of the discharge tube as well as the blind-sealed ends of the tube sections are re-entrant into the zone. The ends of the discharge tube are received in the lamp support housing. The lamp support housing carries means suitable for mechanically and electrically connecting to a socket and include lead-in wires connecting the electrodes directly or through an operating circuit to the means suitable for electrically connecting to a socket.

U.S. Pat. No. 6,633,128, granted Oct. 14, 2003, to Lilies, et al., teaches of a discharge lamp with spiral shaped discharge tube comprising a low-pressure discharge lamp with a double spiral shaped discharge tube including two spiral shaped tube portions. The tube portions define a central axis of the discharge tube. A cold chamber portion connects the ends of the spiral shaped tube portions. The cold chamber portion has a first transversal dimension substantially perpendicular to the central axis that is larger than the diameter of the tube portions. The cold chamber portion further has a second transversal dimension substantially parallel to the central axis. The second transversal dimension of the cold chamber portion substantially corresponds to the diameter of the tube portions.

U.S. Pat. No. 6,650,042, granted Nov. 18, 2003, to E. E. Hammer, discloses a low-wattage fluorescent lamp having at least one mercury cold spot region effective to maintain the mercury in the lamp at less than 30 degrees C., preferably 25. degrees C., in an enclosed lamp fixture. The lamp also features a reduced distance between electrodes resulting in less power being required to sustain an electric arc discharge during operation of the lamp. The lower power electric arc generates less heat to raise the temperature of mercury vapor within the lamp.

U.S. Pat. No. 6,731,070, granted May 4, 2004, to R. P. Scholl, et al., discloses a low-pressure gas discharge lamp having a gas discharge vessel containing a gas filling with a chalcogenide of the elements of the fourth main group of the periodic table of elements and a buffer gas, and having inner or outer electrodes and means for generating and maintaining a low-pressure gas discharge.

U.S. Pat. No. 6,741,023, granted May 25, 2004, to A. Pirovic, discloses an electrode shield for a fluorescent tanning lamp comprising an open cup encircling a filament or electrode increasing the service life of the fluorescent tanning lamp. The cup having an open end acts as a shield reducing the sputtering of impurities onto the glass tube and contaminating the phosphor surface. In one embodiment, the cup is electrically and thermally coupled to an electrode support. The life of the fluorescent tanning lamp is greatly increased despite the use of relatively high currents and large number of on and off cycles.

Therefore, what is needed is a double helical, compact fluorescent lamp that has a plurality of cooling points that will allow the lamp to operate in a vertical position, with the apex facing upwardly, or with the lamp mounted in a horizontal plane, in any rotatable angle about the horizontal axis of the lamp, without degradation of the luminous output of the lamp.

It is therefore an object of the present invention to provide a plurality of cooling points about the periphery of a bi-helical compact fluorescent lamp, said cooling points being arranged about the periphery of the spiraled coils to provide a constant luminous output of the lamp, regardless of its positional angle from the vertical axis of orientation.

It is another object of the present invention to provide a plurality cooling points about the periphery of a bi-helical compact fluorescent lamp, said cooling points being arranged about the inner periphery of the spiraled coils to provide a constant luminous output of the lamp, regardless of its positional angle from the vertical axis of orientation.

It is still another object of the present invention to provide a plurality cooling points about the periphery of a bi-helical compact fluorescent lamp, said cooling points being arranged about the periphery of the spiraled coils at the distal ends to provide a luminous output of the lamp, when operated in a horizontal plane, equivalent to its operation in a vertical position.

It is still yet another object of the present invention to provide a plurality cooling points about the periphery of a bi-helical compact fluorescent lamp, where at least one of said cooling points being arranged proximately at the vertex joining the spiraled coils to provide a luminous output of the lamp, when operated in a vertical position, equivalent to its operation in a horizontal plane.

It is yet still another object of the present invention to provide a cooling point chamber that is an enlargement of the diameter of the lamp tubing, the length preferably not exceeding five diameters, creating a chamber having an increased volume.

An additional object of the present invention is to provide a plurality of cooling point chambers that are shaped as ellipsoidal convexities along the periphery of the tubing.

Yet, another object of the present invention is to provide a plurality of cooling point chambers that are shaped as ellipsoidal convexities along the inner periphery of the tubing.

Yet still another object of the present invention to provide a plurality of cooling point chambers, whose enlargements increase the diameter of the tubing, to decrease the temperature of the mercury vapor where the mercury vapor condenses and is deposited in said respective cooling point.

It is a final object of the present invention to provide a plurality of cooling point chambers having a plurality of enlargements along the length of the tubing; said cooling point chambers being of any arbitrary, generalized geometrical shape whose function is to decrease the temperature of the mercury vapor so that the mercury vapor condenses and is deposited in said respective cooling point.

These and other objects, features, and advantages of the present invention will become apparent from reading the following detailed description, the accompanying drawings, and the appended claims.

SUMMARY OF THE INVENTION

It has been demonstrated experimentally that by positioning a cold chamber at the apex of a spring wound compact fluorescent lamp, whose cross-section is shaped ellipsoidal where the major axis of the ellipsoid is in a vertical position, being the highest point and ovately upright, and when operated in a vertical burn position, a 23-watt lamp typically provides a luminous output ranging from 1600 to 1650 lumens.

However, when the same lamp is positioned in the horizontal plane, where it is radially orthogonal to the vertical axis, the luminous output decreases to only 1350 to 1400 lumens, and has a shorter life expectancy than when operated in the upright position.

But with the present invention, by placing an enlargement, a cooling point shaped as an an ovate convexity, positioned near the last turn on one-half of the spiral wound tubing and another cooling point at the vertex, then the same 23-watt lamp, when mounted in either the horizontal or upright position, produces a luminous output of 1550 lumens.

For a larger, higher-wattage spirally wound fluorescent lamp that uses a greater quantity of mercury, such as with a 42-watt lamp, two cooling points, each shaped as an ovate convexity, are positioned near the last turn on each leg of the spiral wound tubing, as well as one at the vertex at the mid-point of the tubing.

Still additional cooling points may be added along the periphery, such as utilizing three cooling points angularly separated by 120 degrees or four cooling points that are each angularly separated by 90 degrees, so that the lamp, when operated in a horizontal plane, can be placed at any arbitrary rotational angle without any degradation of the luminous output.

BRIEF DESCRIPTION OF THE DRAWINGS

The present invention is pictorially illustrated in the accompanying drawings that are attached herein.

FIG. 4D is a side view of the bi-helical, spirally wound, compact fluorescent lamp, of the present invention, having a first cooling point at the vertex of the lamp, a second cooling point facing inwardly at the first distal extremity of the left-half portion of the tubing, a third cooling point facing inwardly at the first distal extremity of the right-half portion of the tubing, a fourth cooling point facing inwardly and, wherein the second, third and fourth cooling points are in an equal, angularly spaced configuration, 120° apart, on the periphery of the lowest turns of the bi-helical compact fluorescent lamp, such that one of said second, third and fourth cooling points is near the top of the lamp when horizontally positioned, which provides a stable lamp operation in a lamp rotation about its axis in a horizontal plane.

DETAILED DESCRIPTION OF THE INVENTION

The light output of a low-pressure mercury vapor lamp is determined by the saturated mercury vapor pressure which is determined by the temperature of the liquid mercury deposited somewhere on the inner wall of the lamp. In a stabilized lamp this is the coldest part of the bulb: the "cold chamber" or "cold spot." It is then that the saturated mercury vapor pressure is determined from the cold-spot temperature.

The normal light output is related to lamp temperature. Variations in light output of a typical compact fluorescent lamp will change with changes in temperature. The coldest spot on the lamp surface is the temperature that controls the light output of a compact fluorescent lamp. The optimum temperature for compact fluorescent lamps is typically 100° F. (38° C.). However, this will vary for different compact fluorescent lamps and ballasts, but the same general behavior will, with some exceptions, be observed.

Hence, the ambient temperature into which a compact fluorescent lamp is immersed can have a significant effect on the lamp's light output and its lamp efficacy. The temperature of the coldest spot on the surface of the lamp is where the mercury vapor will condense into liquid form, and this temperature (the "minimum lamp wall temperature") controls the vapor pressure inside the lamp. The optimum lamp wall temperature for CF lamps is generally 100° F. (38° C.). At temperatures below the optimum, mercury vapor will condense at the cold spot, reducing the number of mercury atoms available to emit UV radiation: light output drops. At temperatures above the optimum, an excess of mercury vapor is present, absorbing the UV radiation before it can reach the phosphors; therefore the light output also decreases.

Figure 1:
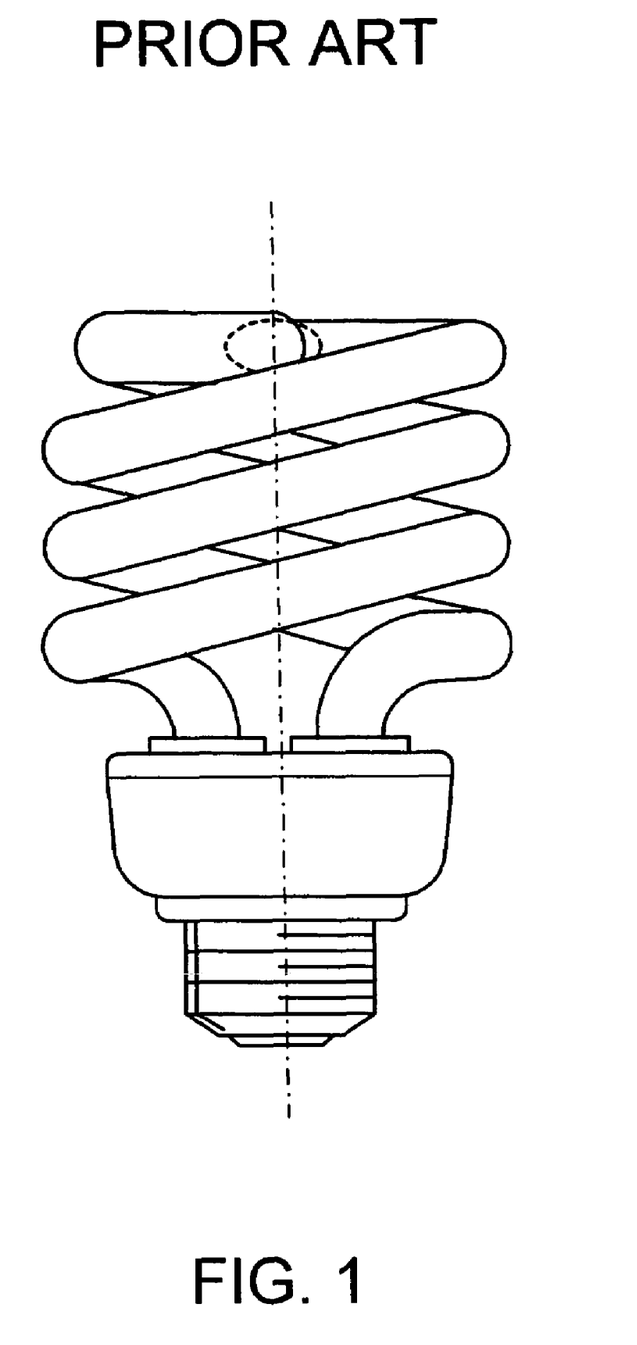
FIG. 1 is a side view of a prior art fluorescent lamp that illustrates a conventional double spiral shaped tubing, having a cold chamber at the apex of the lamp and connecting the ends of the spirally shaped tube portions.
Figure 2:
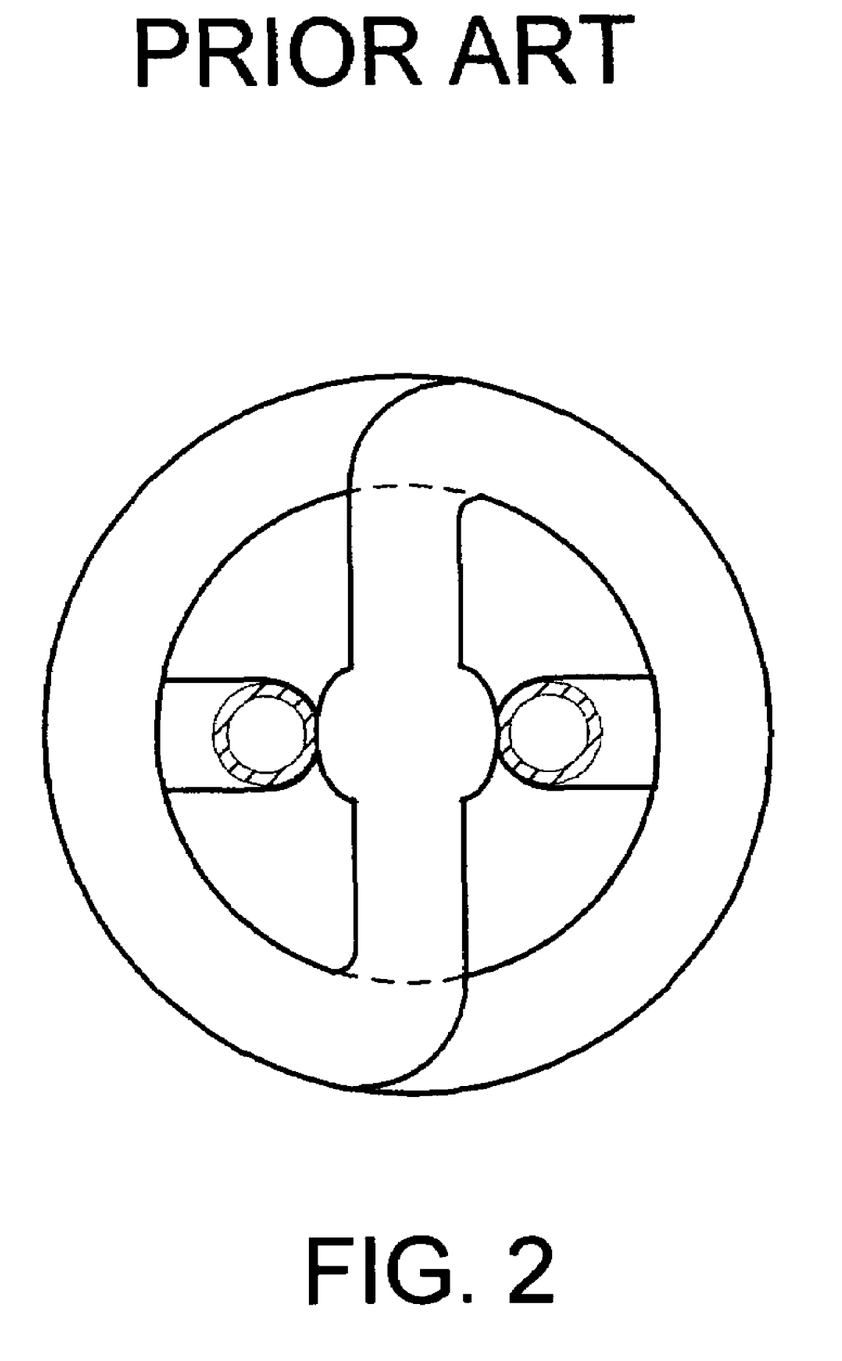
FIG. 2 is a top view of the prior art double spiral shaped fluorescent lamp, having a cold chamber at the apex of the lamp and connecting the ends of the spirally shaped portion.

Referring now to FIGS. 1 and 2, there is shown in the PRIOR ART, a spiral shaped low pressure discharge lamp, having a cold chamber at the top of the lamp. It has been determined experimentally that by positioning a cold chamber at the top of a spiral shaped compact fluorescent lamp, and when operated in a vertical burn position, the lamp typically provides a luminous output ranging from 1600 to 1650 lumens. However, when the same lamp is positioned in the horizontal plane, the luminous output decreases to only 1350 to 1400 lumens, where the lamp has a shorter life expectancy.

Turning now to FIGS. 3, 3A, 3B and 3C, there is shown the preferred embodiment of a low-wattage bi-helical compact fluorescent lamp 10 of the present invention. This embodiment relates to a low-wattage compact fluorescent lamp, having preferably a wattage rating of preferably 23-watts.

Figure 3:
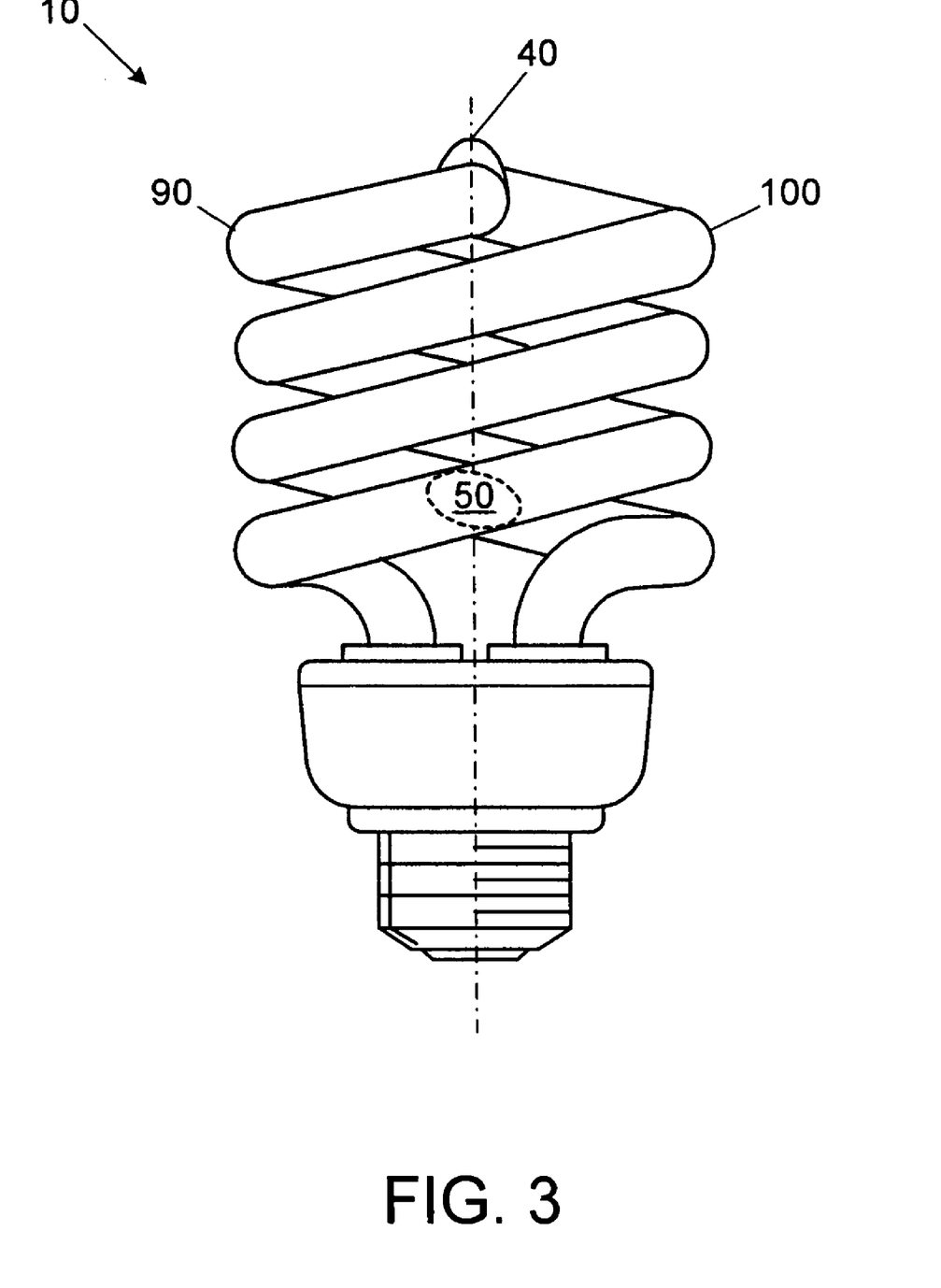
FIG. 3 is a side view of a bi-helical, spirally wound, compact fluorescent lamp, of the present invention, having a first cooling point at the apex of the lamp, and a second cooling point facing inwardly on the first distal turn of the first-half portion of the tubing.
Figure 3A:
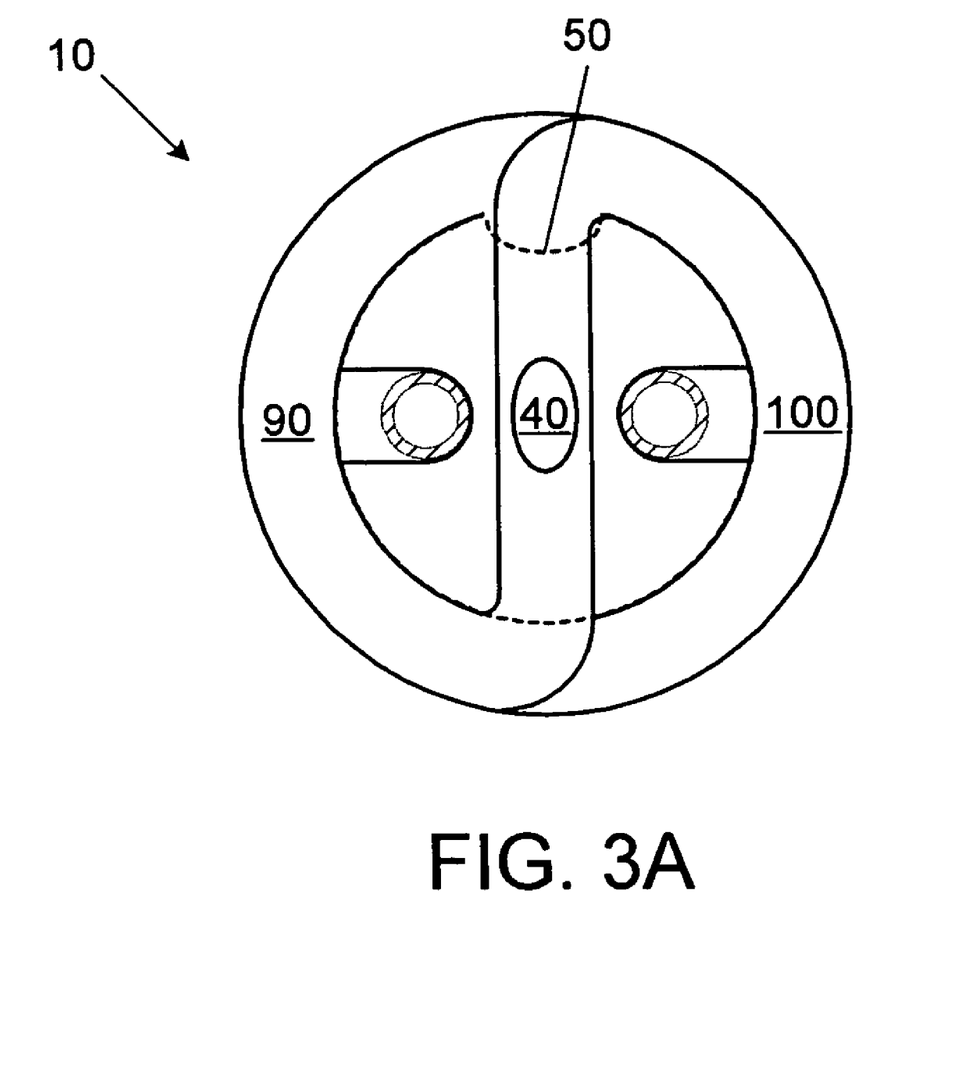
FIG. 3A is a top view of the bi-helical, spirally wound, compact fluorescent lamp, of the present invention, having a first cooling point at the apex of the lamp, and a second cooling point facing inwardly on the first distal turn of the first-half portion of the tubing.
Figure 3B:
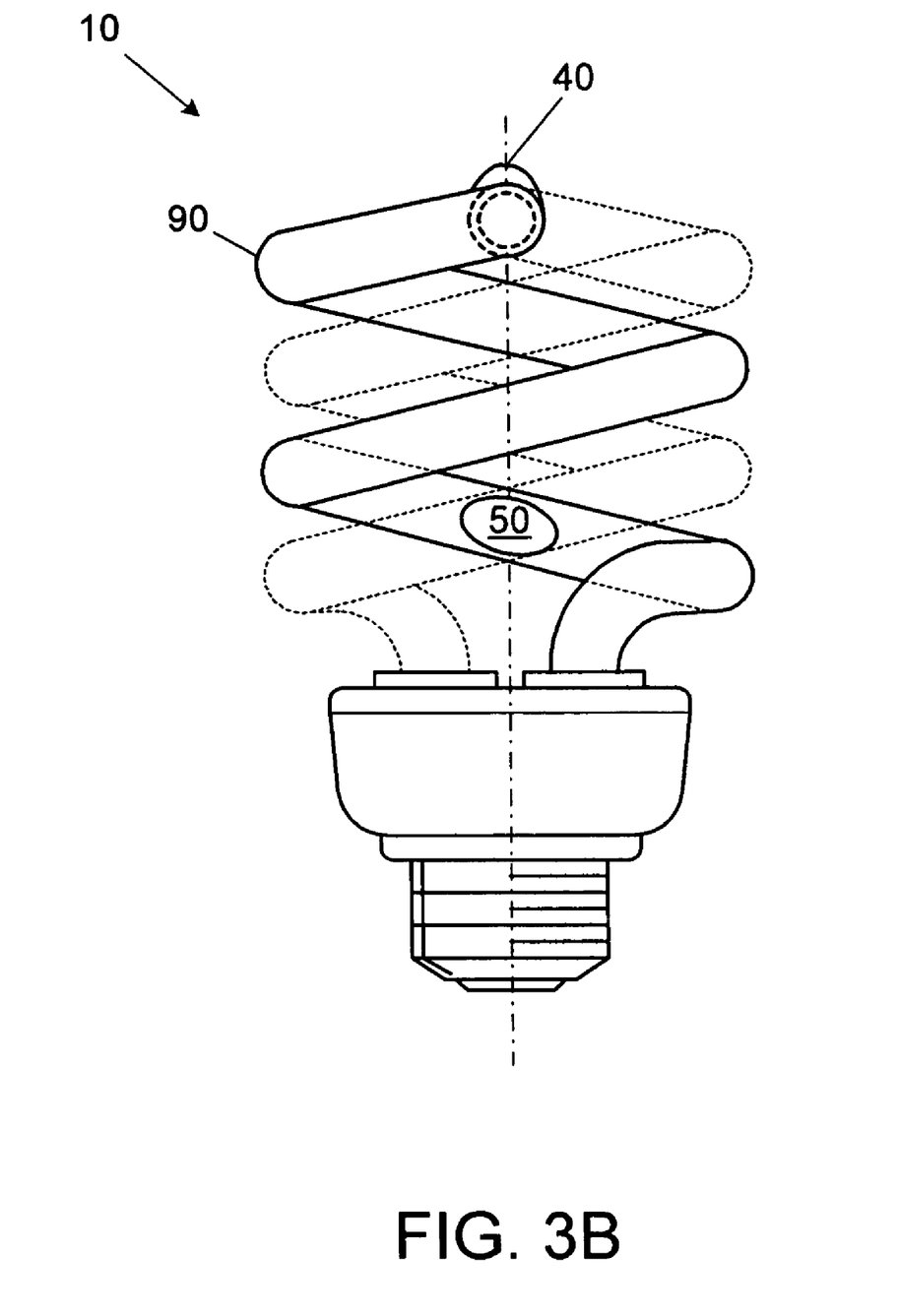
FIG. 3B is a side view of a bi-helical, spirally wound, compact fluorescent lamp, of the present invention, showing the left hand side spiral wound tube, having a first cooling point at the apex of the lamp, and a second cooling point facing inwardly on the first distal turn of the first-half portion of the tubing.
Figure 3C:
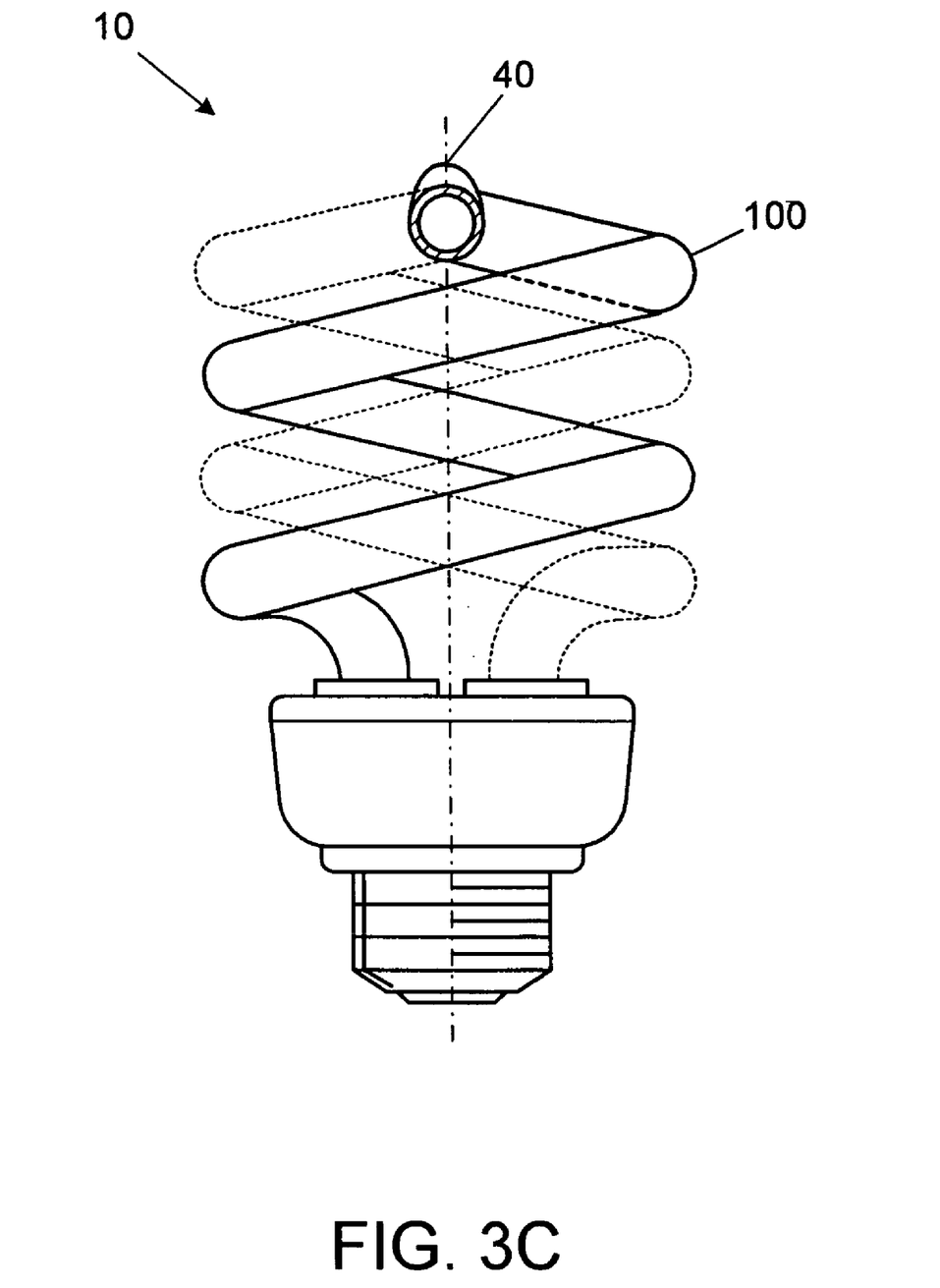
FIG. 3C is a side view of the bi-helical, spirally wound, compact fluorescent lamp, of the present invention, showing the right hand side spiral wound tube, having a first cooling point at the apex of the lamp, and a second cooling point facing inwardly on the first distal turn of the second-half portion of the tubing.

In this embodiment of the present invention, there is provided two cooling points 40 and 50 to sustain constant luminous output when the lamp is mounted in either in an upright position or mounted lying in the horizontal plane. Each cooling point is an enlargement shaped preferably as an ellipsoidal convexity; the first cooling point 40 being at the vertex joining a first left-half spiral tube 90 with a right-half spiral tube 100, whose cross-section is ellipsoidal, where its major axis is in a vertical position, and the convexity so formed is in the highest upright position. The second ovate cooling point 50 is located at the distal end of the left-half portion of the spiral shaped tube 90, as shown in FIG. 3B, thereby giving nonsymmetrical operation for a low-wattage compact fluorescent lamp.

The volume of mercury entrained within a cooling point is such as to produce a temperature that is ideally 38 degrees Centigrade (100 degrees Fahrenheit). If the volume of the cooling point is too small, then the operating temperature of the mercury vapor will be above the optimum temperature of 38° C. Conversely, if the volume of the cooling point is oversized, then the operating temperature of the mercury vapor will be below the optimum temperature of 38° C.

Still another consideration for the placement of the cooling point chambers is where the cold chambers that are placed too far apart from each other, which may also result in a nonoptimal luminous output. The placement of these cold chambers requires careful placement to maintain a constant luminous output regardless into which plane the lamp is mounted in.

Therefore, as the wattage-rating of a compact fluorescent lamp is increased, the volume of the mercury vapor increases, along with its operating temperature. Consequently, a medium-wattage compact fluorescent lamp 20 is provided as a second embodiment, as shown in FIGS. 4, 4A, 4B and 4C, that has a single cooling point 40 at the vertex and two additional cooling points 50 and 60 at the distal ends of each half portion of the bi-helical lamp tubing 110.

In this second embodiment of the present invention 20, there is provided three cooling points 40, 50 and 60 to sustain constant luminous output when the lamp is mounted in either in an upright position or mounted lying in the horizontal plane.

There is a total of three cooling points—one, 40, at the vertex for a vertical burn position and two, 50 and 60, located on the last turn near each leg. As the lamp wattage is increased, it becomes necessary increase the number of cooling points because of the greater quantity of mercury needed for proper lamp operation.

Figure 4:
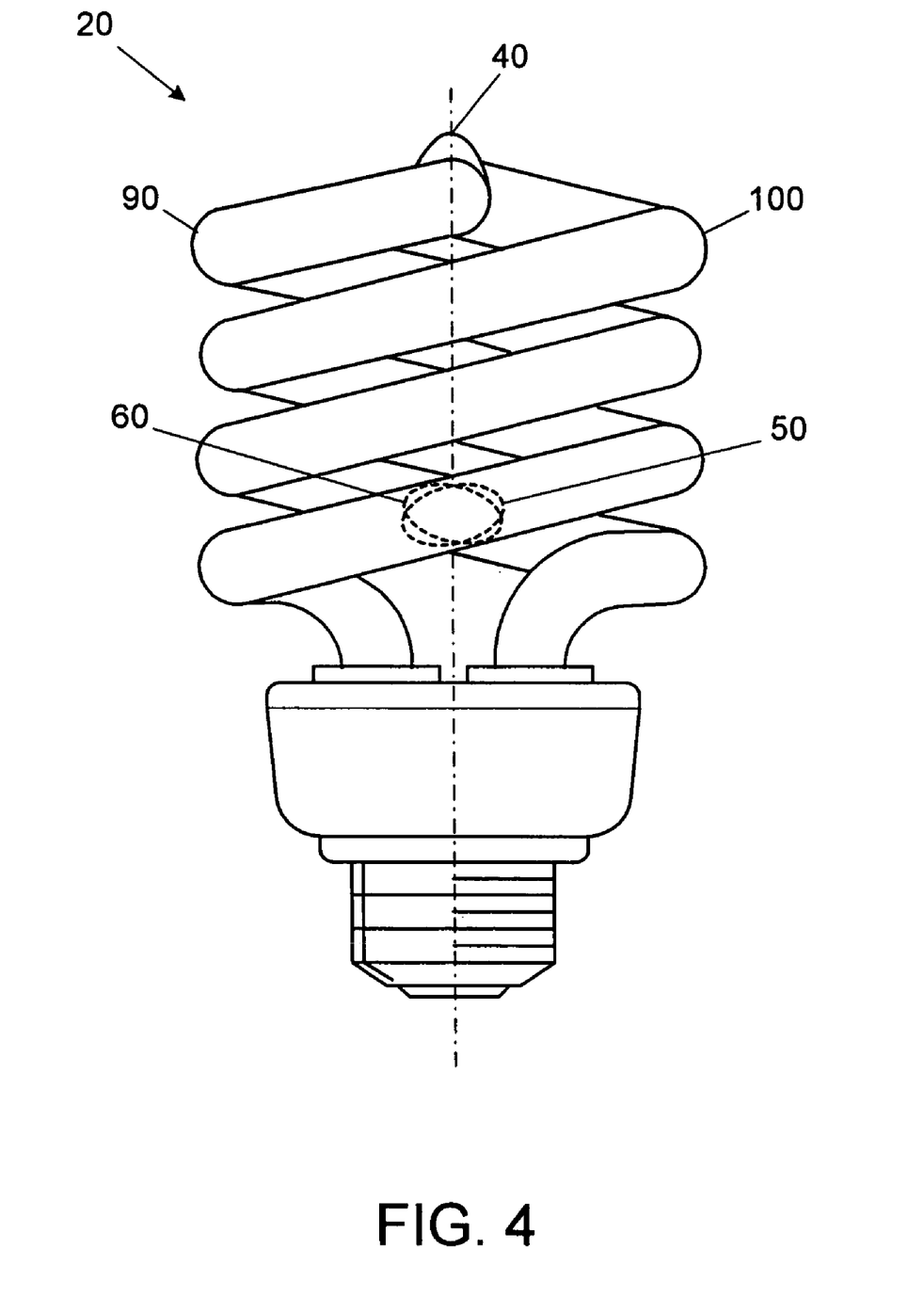
FIG. 4 is a side view of a bi-helical, spirally wound, compact fluorescent lamp, of the present invention, having a first cooling point at the apex of the lamp, a second cooling point facing inwardly on the first distal extremity of the left-half portion of the tubing, and a third cooling point facing inwardly on the first distal extremity of the right-half portion of the tubing.
Figure 4A:
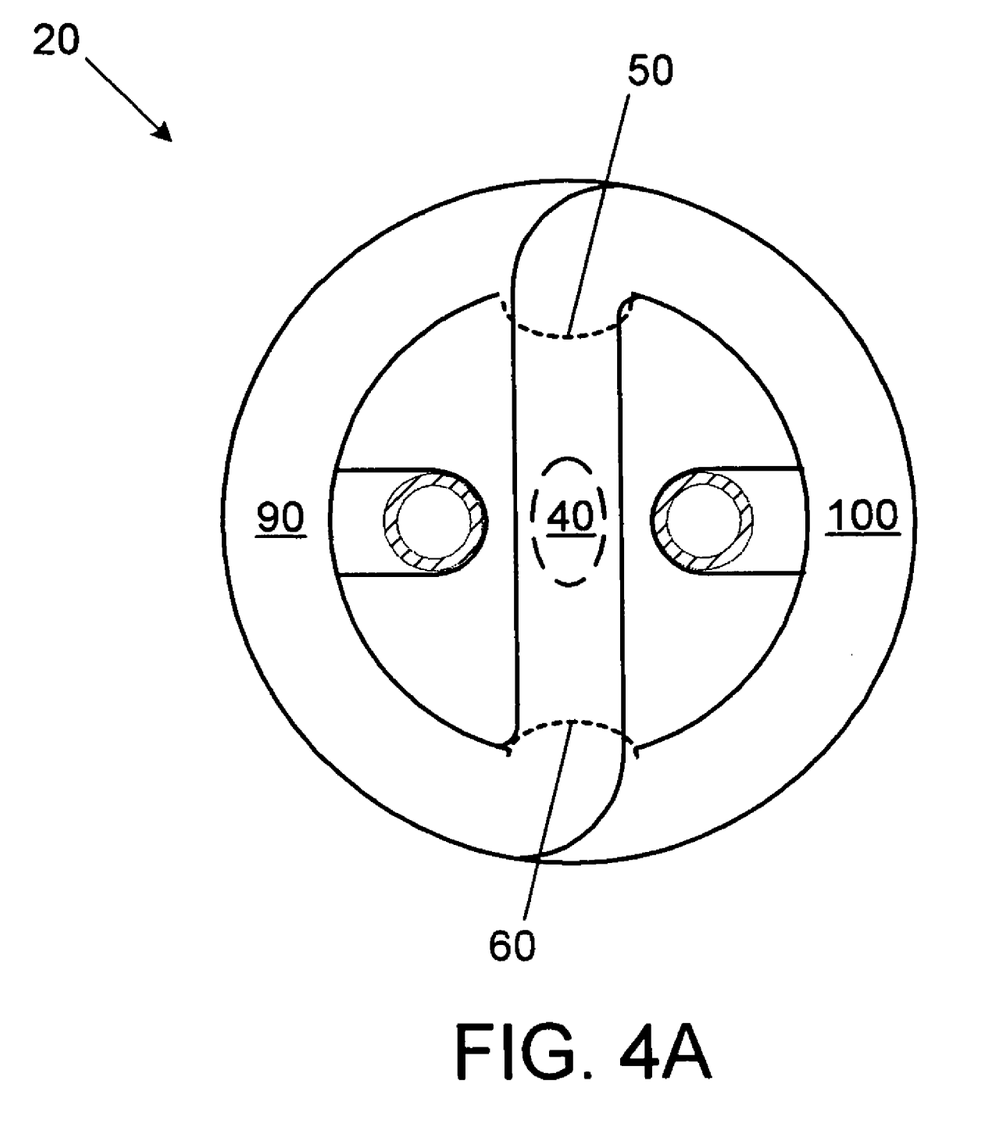
FIG. 4A is a top view of the bi-helical, spirally wound, compact fluorescent lamp, of the present invention, having a first cooling point at the apex of the lamp, a second cooling point facing inwardly on the first distal turn of the left-half portion of the tubing, and a third cooling point facing inwardly on the first distal turn of the right-half portion of the tubing.
Figure 4B:
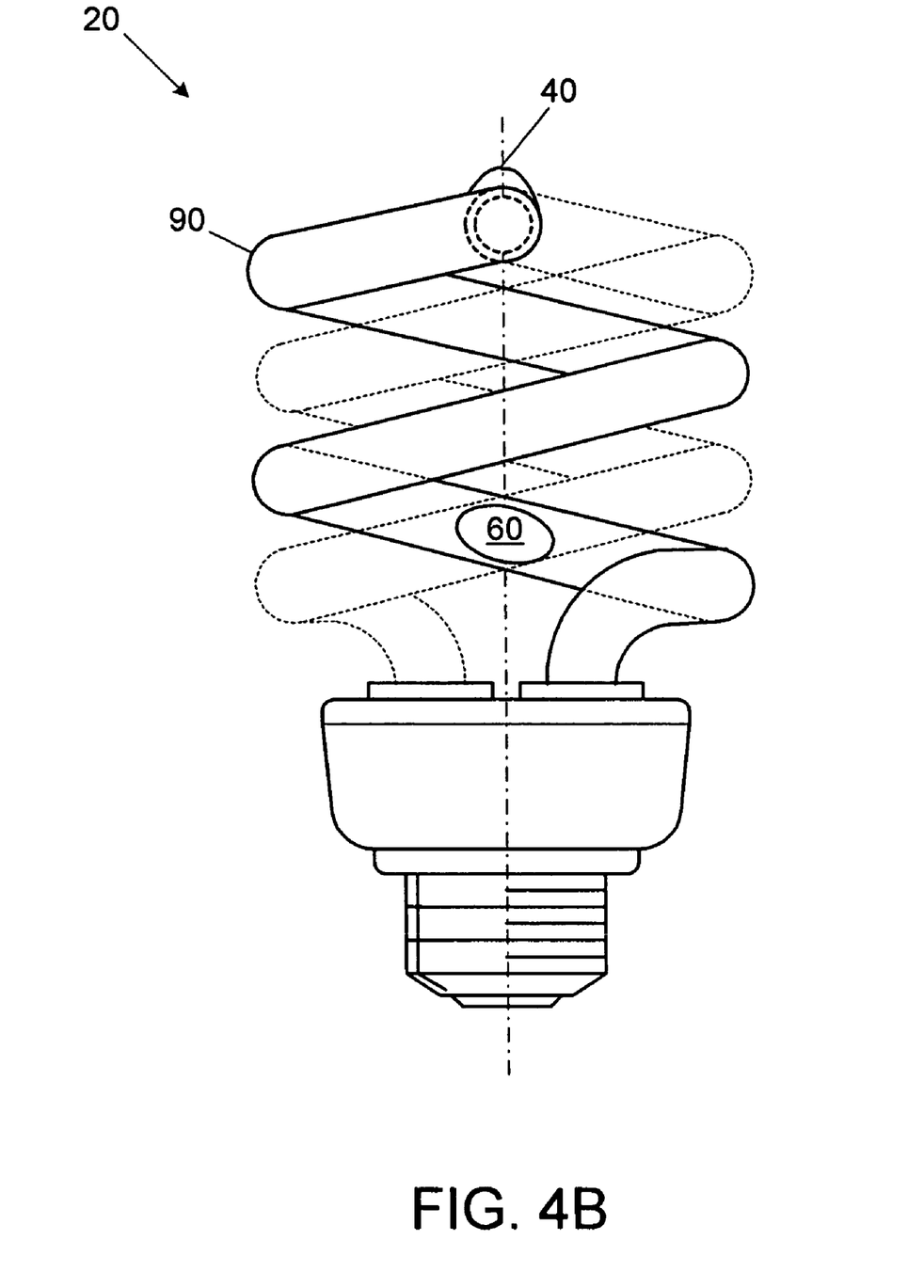
FIG. 4B is a side view of a bi-helical, spirally wound, compact fluorescent lamp, of the present invention, showing the left hand side spiral wound tube, having a first cooling point at the apex of the lamp, a second cooling point facing inwardly on the first distal turn of the left-half portion of the tubing, and a third cooling point facing inwardly on the first distal turn of the right-half portion of the tubing.
Figure 4C:
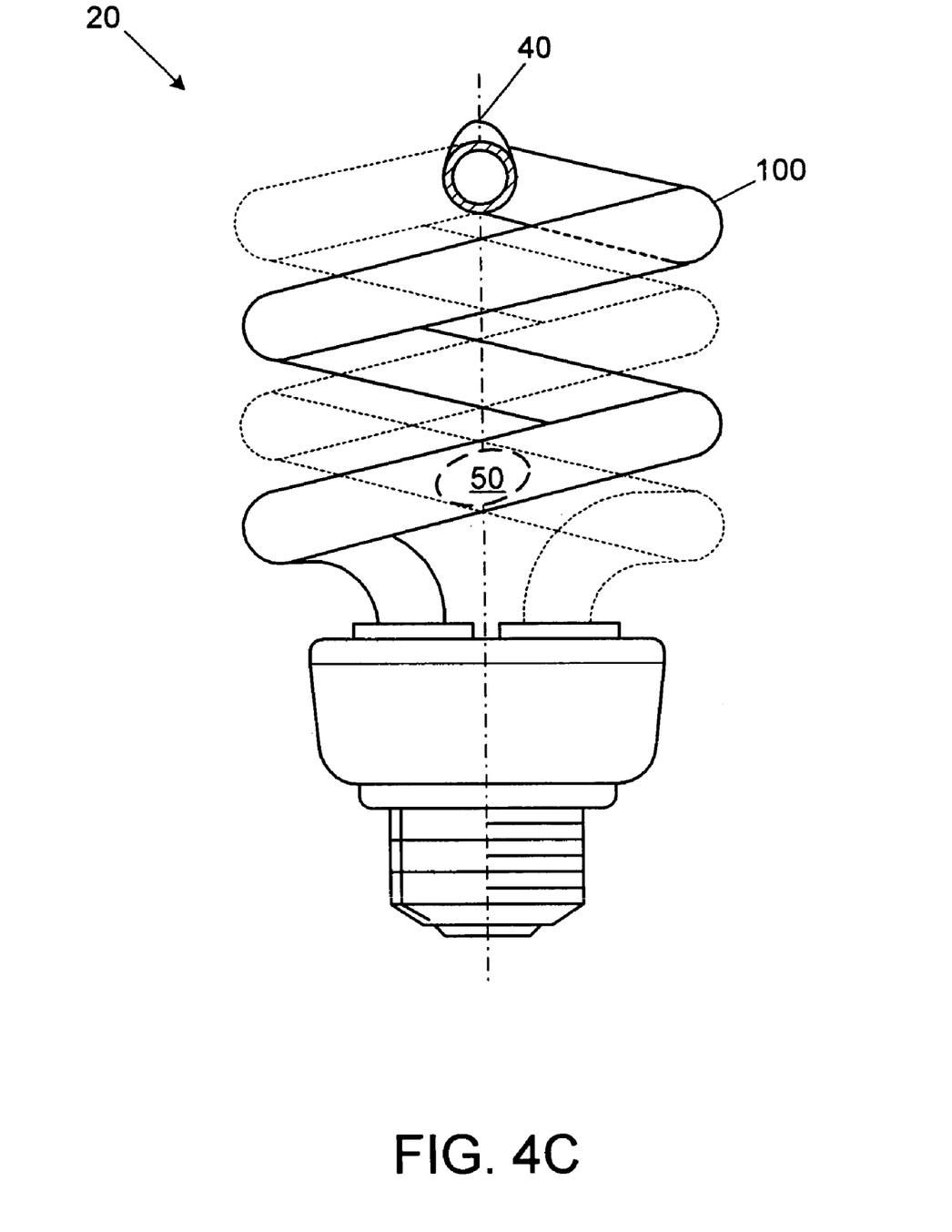
FIG. 4C is a top view of the bi-helical, spirally wound, compact fluorescent lamp, of the present invention, showing the right hand side spiral wound tube, having a first cooling point at the apex of the lamp, a second cooling point facing inwardly on the first distal turn of the left-half portion of the tubing, and a third cooling point facing inwardly on the first distal turn of the right-half portion of the tubing.
Figure 4D:
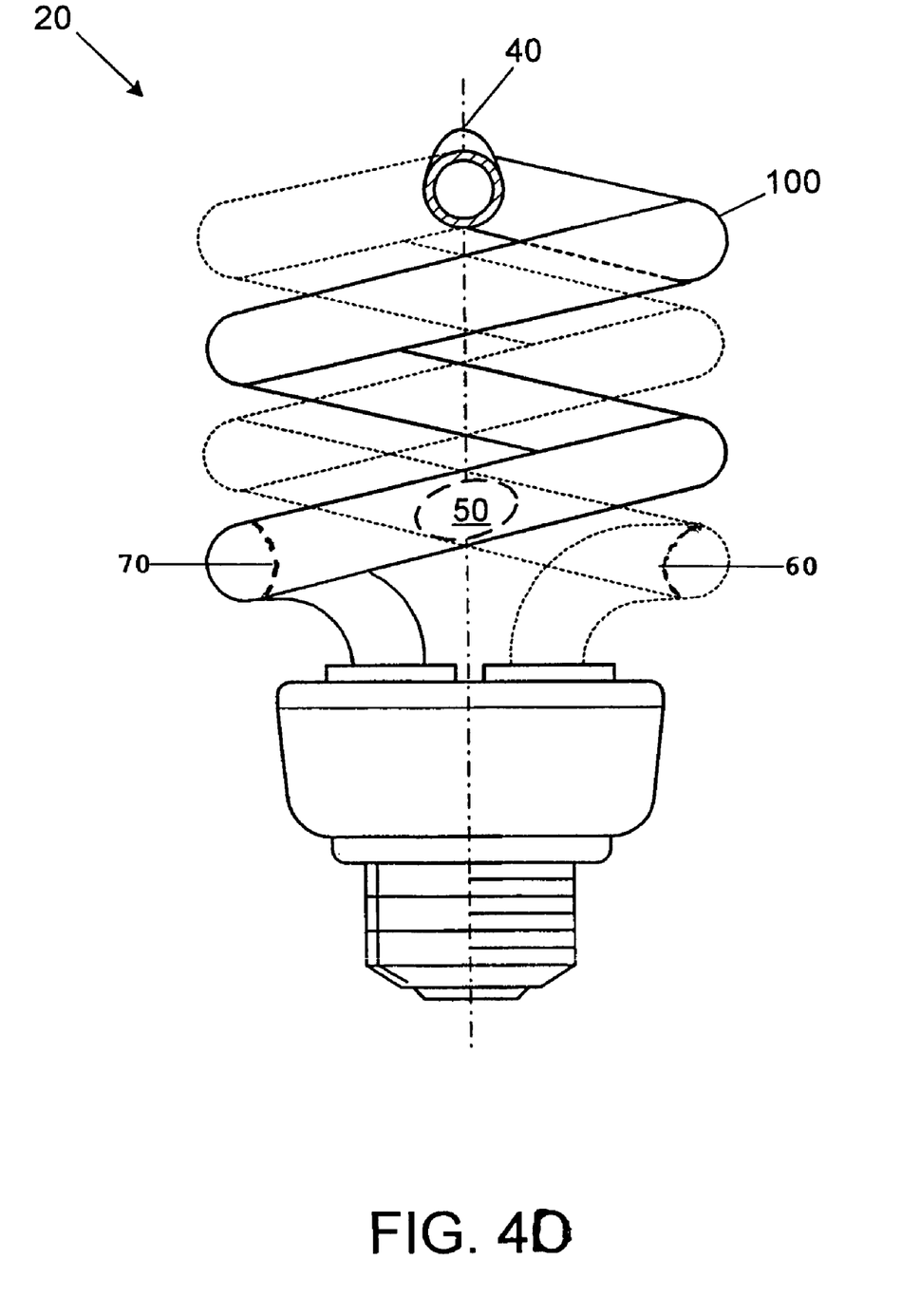

Each cooling point is an enlargement shaped preferably as an ellipsoidal convexity; the first cooling point 40 being at the vertex joining a first left-half spiral tube 90 with a right-half spiral tube 100, whose cross-section is ellipsoidal, where its major axis is in a vertical position, and the convexity so formed is in the highest upright position. A second ovate cooling point 50 is located at the distal end of the left-half portion 90 of the spiral shaped tube, as shown in FIG. 4B and a third ovate cooling point 60 is located at the distal end of the right-half portion 100 of the spiral shaped tube, as shown in FIG. 4C.

The three additional, equal-angularly spaced (120°) apart, cooling chambers shown in FIG. 4D, 50,60,70, are positioned along the periphery of the lowest turns of the bi-helical compact fluorescent lamp, have been found to provide stable rotational operation concurrent with the lamp rotation about its axis while situated in the horizontal plane.

For even larger higher wattage compact fluorescent lamps 30, another possible cold chamber configuration is shown in FIGS. 5, 5A, 5B and 5C.

Figure 5:
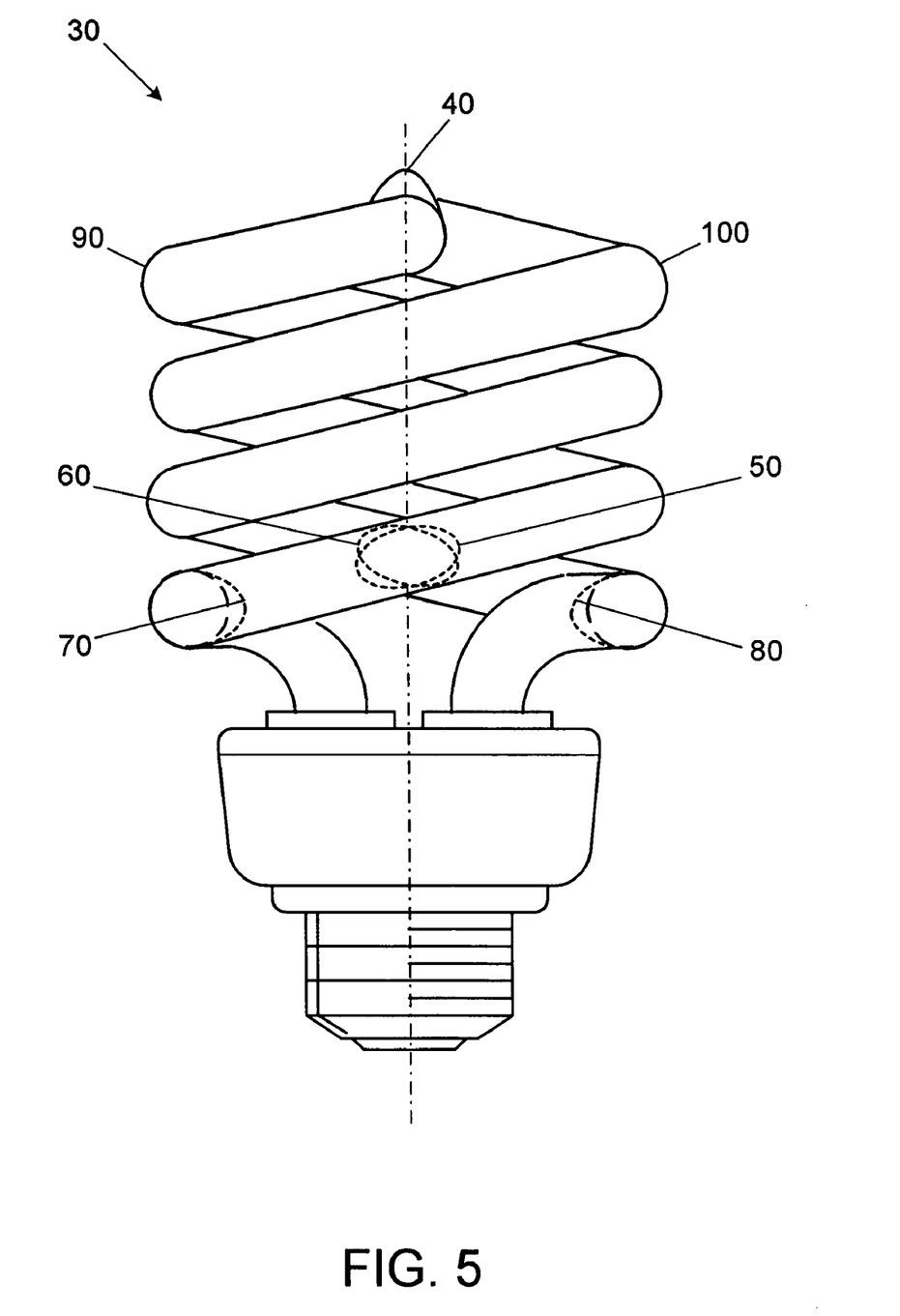
FIG. 5 is a side view of a bi-helical, spirally wound, compact fluorescent lamp, of the present invention, having a first cooling point at the vertex of the lamp, a second cooling point facing inwardly at the first distal extremity of the left-half portion of the tubing, a third cooling point facing inwardly at the first distal extremity of the right-half portion of the tubing, a fourth cooling point facing inwardly and orthogonal to the second and third cooling points, and a fifth cooling point oppositely disposed to the fourth cooling point.
Figure 5A:
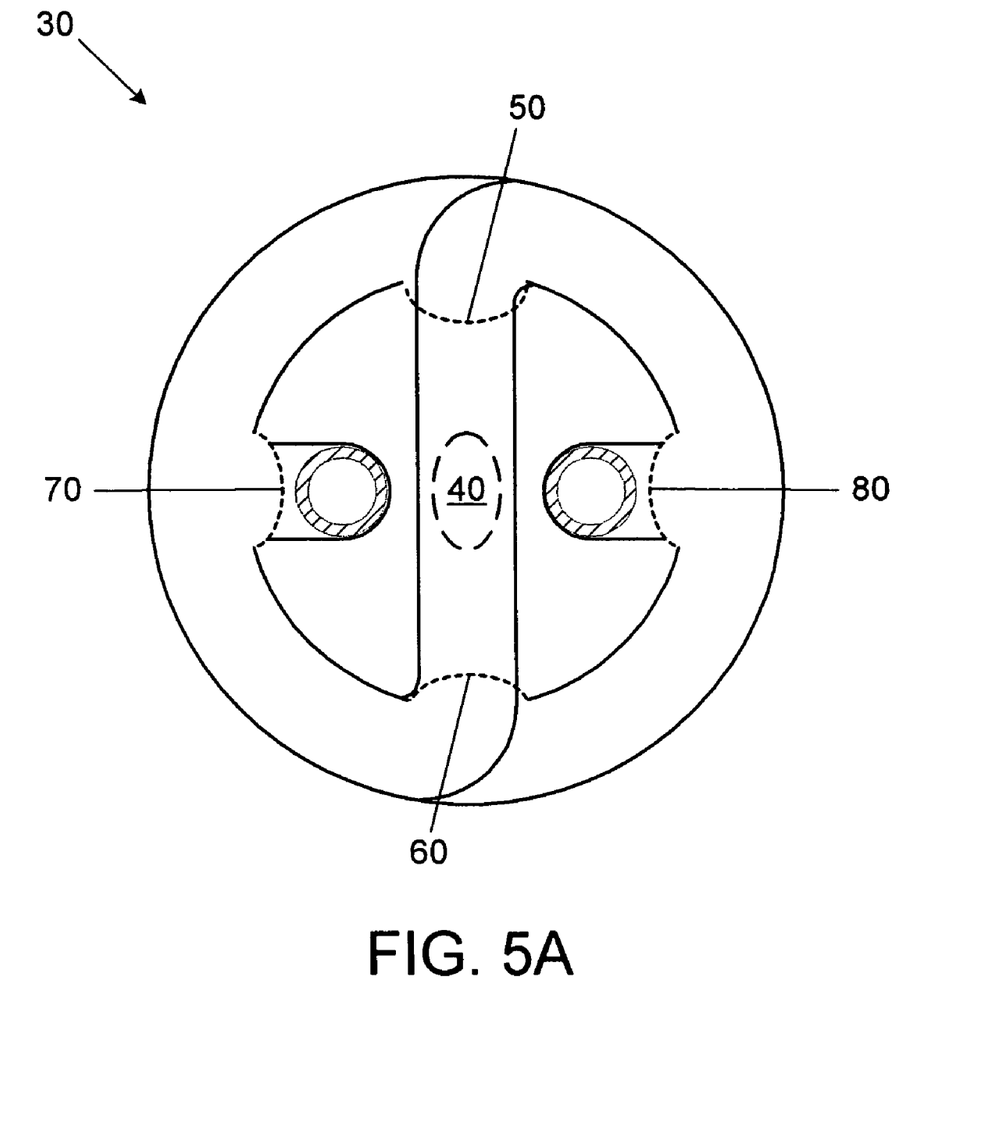
FIG. 5A is a top view of a bi-helical, spirally wound, compact fluorescent lamp, of the present invention, having a first cooling point at the vertex of the lamp, a second cooling point facing inwardly at the first distal extremity of the left-half portion of the tubing, a third cooling point facing inwardly at the first distal extremity of the right-half portion of the tubing, a fourth cooling point facing inwardly and orthogonal to the second and third cooling points, and a fifth cooling point oppositely disposed to the fourth cooling point.

In this third embodiment 30, there is one upright ovate cooling point 40 located at the vertex for operation in an upright position and four, equal-angularly spaced (90°) cooling chambers, 50, 60, 70 and 80, positioned along the periphery of the lowest turns of the bi-helical compact fluorescent lamp.

When this lamp is mounted in the horizontal plane, the use of four cooling points coact such as to resolve into a rotational vector where the lamp will provide an equivalent luminous output for any angle of rotation about the lamp's axis within the horizontal plane.

Figure 6:
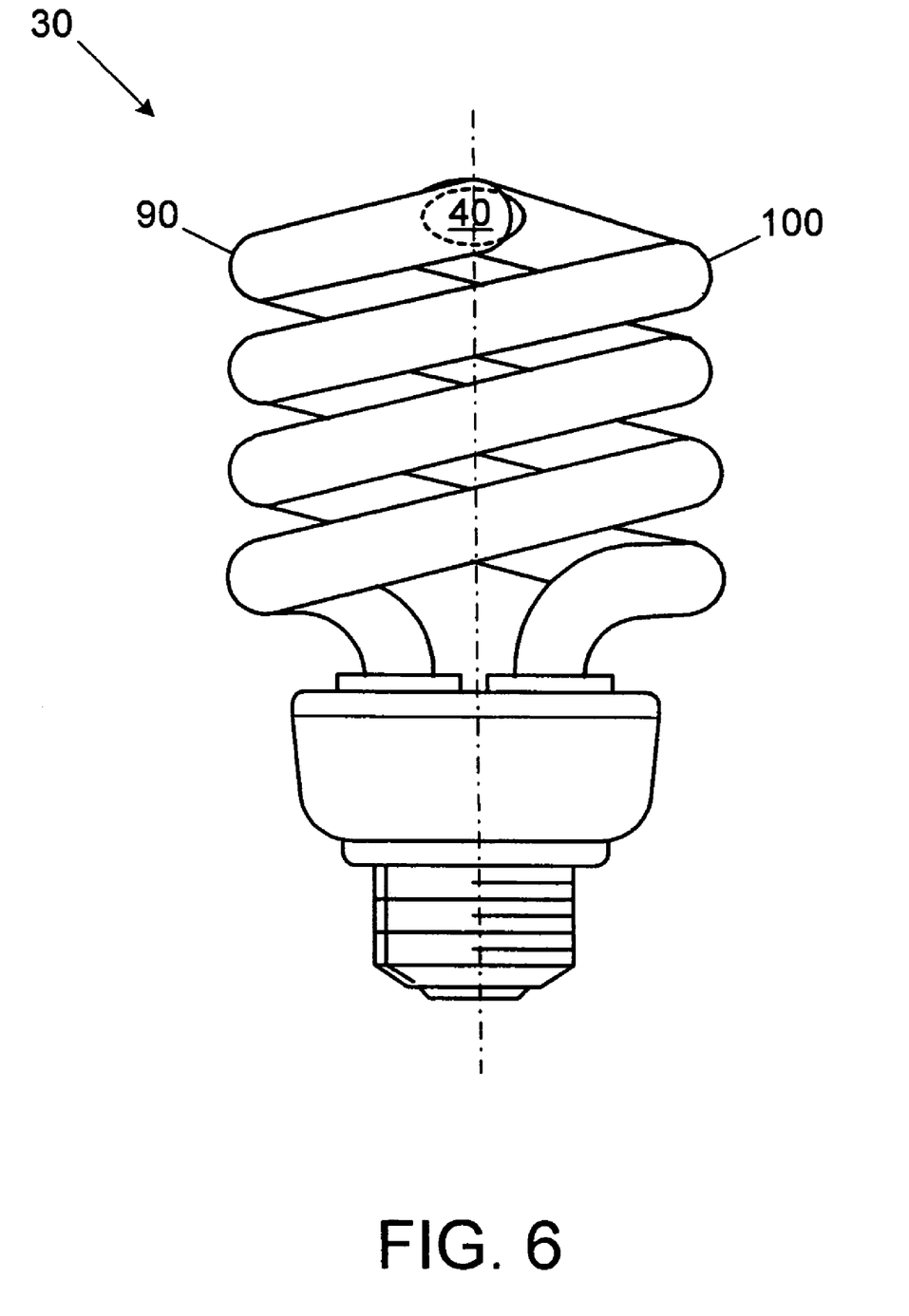
FIG. 6 is a side view of an alternative embodiment of the compact fluorescent lamp that illustrates a conventional double spiral shaped, having a flattened ovate cold chamber lying horizontal at the apex of the lamp and connecting the ends of the spirally shaped portion.

Turning now to FIG. 6, there is shown in an alternative embodiment, for the size, shape and position of a cooling point chamber at the vertex of the bi-helical compact fluorescent lamp. In this embodiment, the cooling point 40 has a cross-section that is ellipsoidal, where its major axis is in a horizontal position, and the convexity so formed is symmetric and lies along its horizontal major axis.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the claims contained herein.

The invention claimed is:

1. A low-wattage bi-helical compact fluorescent lamp, comprising a spiral wound tubing formed by two spiral tubes joined at an apex with a first cooling point positioned at a vertex that joins a first left-half spiral tube with a right-half spiral tube of the lamp and a second cooling point positioned proximate to a lamp base; wherein each of said cooling points comprises an enlargement of a spring lamp tube diameter with a cooling point length not exceeding 5 times a tube diameter, wherein the enlargement provides a cooling point chamber that increases a volume of the lamp tube; wherein each cooling point chamber includes a shape of an ellipsoidal convexity, the first cooling point having an ellipsoidal cross-section with its major axis in a vertical position, and the convexity so formed is in a highest upright position; and the second cooling point is positioned at a distal end on the periphery of the left-half portion of the spiral shaped tube and provides a non-symmetrical lamp operation; wherein each of said cooling points affords a mercury vapor condensation to a liquid that is deposited in a cooling point chamber; wherein said cooling points control the mercury vapor pressure at approximately six millitorr.

2. A double helical compact fluorescent lamp as recited in claim 1, wherein a volume of mercury entrained within the cooling points produce a lamp wall temperature of 38 degrees Centigrade, whereby the cooling points sustain a constant luminous output when the lamp is mounted in either an upright position or mounted in a horizontal plane.

3. A double helical compact fluorescent lamp as recited in claim 2, wherein said second cooling point is positioned on an inner periphery of the spiraled coils and wherein the cooling point has an ellipsoidal cross-section, wherein its major axis is in a horizontal position, and a convexity so formed is symmetric and lies along its horizontal major axis; wherein the cooling points control the mercury vapor temperature and pressure and enable a radiation of 2537 angstroms for exciting a phosphor coating on an interior of the spiral tubing, and a lamp operation in a vertical position that is equivalent to its operation in a horizontal position.

* * * * *